United States Patent [19]

Meier

[11] Patent Number: 5,520,221
[45] Date of Patent: May 28, 1996

[54] FLOWMETER MEASURING TUBE

[75] Inventor: Dieter Meier, Gottingen, Germany

[73] Assignee: Fisher & Porter Company, Warminster, Pa.

[21] Appl. No.: 373,765

[22] Filed: Jan. 17, 1995

Related U.S. Application Data

[62] Division of Ser. No. 675,457, Mar. 26, 1991, Pat. No. 5,403,533.

[51] Int. Cl.$^6$ .................................................. F16L 57/00
[52] U.S. Cl. ........................ 138/109; 138/110; 138/96 R; 285/55
[58] Field of Search .................... 138/109, 96 R, 138/97; 264/249, 269, 294, 296, 320, 322; 285/54, 55; 29/512, 513, 525.1

[56] References Cited

U.S. PATENT DOCUMENTS

| | | | |
|---|---|---|---|
| B 364,786 | 1/1975 | Pero | 138/109 |
| 2,157,107 | 5/1939 | Bay | 138/96 R X |
| 2,195,403 | 4/1940 | Bay | 138/96 R |
| 2,216,033 | 9/1940 | Hopkins | 285/55 X |
| 2,225,615 | 12/1940 | Bay | 138/96 R |
| 2,308,307 | 1/1943 | Robinson | 285/55 X |
| 2,806,718 | 9/1957 | Cook et al. | 285/55 |
| 2,982,311 | 5/1961 | Haskell | 138/100 |
| 3,047,937 | 8/1962 | deVecchi . | |
| 3,347,568 | 10/1967 | Weeden, Jr. et al. | 285/55 |
| 3,383,750 | 5/1968 | Schroeder et al. | 29/157 |
| 3,417,786 | 12/1968 | Schnabel | 285/55 X |
| 3,435,109 | 3/1969 | Flaming | 264/296 |
| 3,435,853 | 4/1969 | Weeden et al. . | |
| 3,459,619 | 8/1969 | Maxwell | 156/293 |
| 3,959,424 | 5/1976 | Dawson et al. . | |
| 3,968,552 | 7/1976 | Hunter | 285/55 X |
| 4,124,675 | 11/1978 | McFarlane . | |
| 4,191,305 | 3/1980 | Davis . | |
| 4,198,365 | 4/1980 | Pelton . | |
| 5,094,795 | 3/1992 | McMillan et al. . | |
| 5,105,524 | 4/1992 | Darling . | |
| 5,199,153 | 4/1993 | Schulte-Ladbeck | 264/249 X |

FOREIGN PATENT DOCUMENTS 827550  1/1952  Germany .

*Primary Examiner*—Timothy F. Simone
*Assistant Examiner*—Patrick F. Brinson
*Attorney, Agent, or Firm*—Ratner & Prestia

[57] ABSTRACT

A measuring tube for a flowmeter. The measuring tube is lined with a tubular lining of thermoplastic material, particularly PTFE or PFA, which comes into contact with the measured substance which flows through the tube. The ends of the tubular lining are flanged around end flanges of the measuring tube after the ends of the tubular lining have been plasticised by heating. The plasticised ends of the tubular lining are turned outward by more than 90° and then forced into undercuts in the end faces of the end flanges. Upon cooling, the ends of the lining are in intimate contact with the end faces of the end flanges and the undercuts in the end faces.

8 Claims, 1 Drawing Sheet

FLOWMETER MEASURING TUBE

This application is a division of application Ser. No. 07/675,457, filed Mar. 26, 1991, now U.S. Pat. No. 5,403,533, (status: allowed).

TECHNICAL FIELD

The present invention relates, in general, to lining fluid-carrying tubes and, in particular, to a process for lining the measuring tube of a flowmeter and the article made by this process.

BACKGROUND OF THE INVENTION

In a known process of this kind, the ends of the tubular lining are heated and flanged onto sealing strips which are located on the end faces of the end flanges and which encircle the measuring tube. After the flanging, the flanged ends of the lining have a tendency to return to their original tubular shape, with the result that they detach themselves from the sealing strips. This frequently leads to damage when the measuring tube is installed.

SUMMARY OF THE INVENTION

The aim of the present invention is to provide a process and an article made by the process by which the flanged ends of the tubular lining do not detach themselves from the end flanges after the flanging process.

As a result of the fact that the ends of the tubular lining are opened out by more than 90° by heating after the plasticisation, annular forces are produced in the ends which cause the ends to shrink, as they cool, around the non-widened portions of the tubular lining.

If the flanging is carried out in undercuts on the end faces of the end flanges, the ends of the tubular lining can no longer detach themselves from the end flanges.

BRIEF DESCRIPTION OF THE DRAWING

The present invention is hereinafter described with reference to embodiments by way of example, referring to the accompanying drawings.

DETAILED DESCRIPTION OF THE INVENTION

Figure 1:
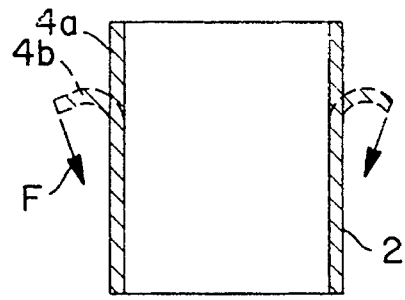
FIG. 1 explains the process of widening by more than 90 in accordance with the present invention.

FIG. 1 shows an end portion of a tubular lining 2 (i.e. PTFE or PFA) with an end 4a which has not yet been everted (i.e. opened out) and an end 4b which has been opened out by more than 90° after plasticising, for example, by heating. When the opened out end 4b cools, forces are produced in the direction of the arrow F which ensure a secure hold for a flanged connection.

Figure 2:
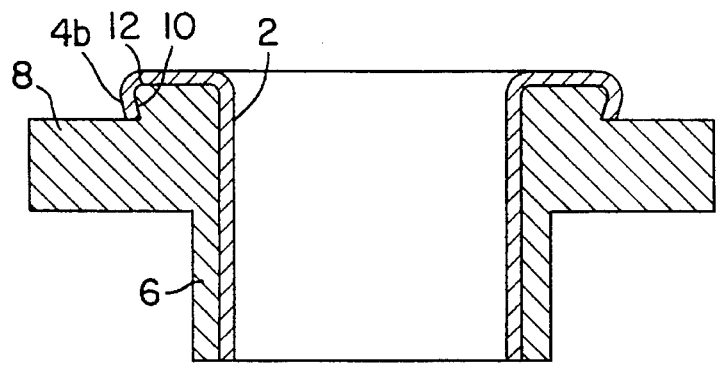
FIG. 2 shows a first embodiment of a flanging in accordance with the present invention.

FIG. 2 shows an end portion of a measuring tube 6 with an end flange 8 which has an acute-angled undercut 10. The outer edge 12 or contact surface of the undercut 10 is rounded. The end 4b according to FIG. 1 is flanged into the undercut 10.

Figure 3:
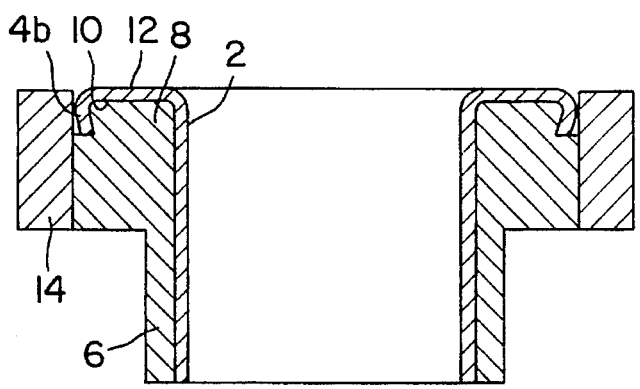
FIG. 3 shows a second embodiment of the present invention with an additional securing of the flange connection.

In the embodiment according to FIG. 3, the end flange 8 radially adjoins the undercut 10, so that precisely the flanged end 4b of the tubular lining 2 has room in the undercut 10. In order to secure the end 4b even more, the end flange 8 is enclosed by an annular mounting 14 which forces the end 4b of the tubular lining 2 into the undercut 10.

Figures 4, 5, 6:
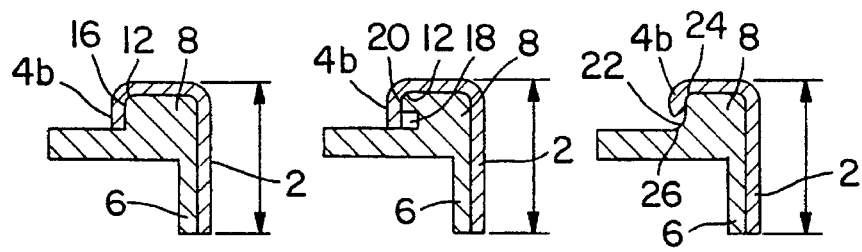
FIGS. 4, 5 and 6 show different undercuts made in the end faces of the end flanges of a flowmeter tube in accordance with the present invention.

FIG. 4 shows a right-angled undercut 16 in the end flange 8.

FIG. 5 shows an inwardly directed annular groove 18 in which an undercut 20 ends.

FIG. 6 shows a substantially acute angled undercut 22, the outer edge 24 and inner edge 26 of which are rounded.

What is claimed:

1. A flowmeter measuring tube comprising:
   a tube having:
   (a) a longitudinal axis,
   (b) an end face with:
      (1) an opening therein,
      (2) a first surface extending radially outwardly from said opening, and
      (3) a second surface spaced longitudinally from and connected to said first surface by a surface forming a circumferential undercut in said end face and extending radially outwardly from said undercut; and
   a tubular lining of thermoplastic material of lesser thickness than said tube:
   (a) extending from within said tube from said opening in said tube across said end face of said tube with a free end of said tubular lining in said undercut in said end face, and
   (b) in intimate, secure and non-detachable contact with said tube.

2. A flowmeter measuring tube according to claim 1 wherein said first surface of said end face and said surface forming said circumferential undercut in said end face are joined by a rounded surface.

3. A flowmeter measuring tube according to claim 1 wherein the angle between said first surface of said end face and said surface forming said circumferential undercut in said end face is an acute angle.

4. A flowmeter measuring tube according to claim 1 wherein the angle between said first surface of said end face and said surface forming said circumferential undercut in said end face is a right angle.

5. A flowmeter measuring tube according to claim 1 wherein said surface forming said circumferential undercut in said end face has an annular groove into which said free end of said tubular lining is fitted.

6. A flowmeter measuring tube according to claim 1 further including an annular ring surrounding said tubular lining and securing said tubular lining between said annular ring and said surface forming said circumferential undercut in said end face.

7. A flowmeter measuring tube according to claim 1 wherein said second surface of said end face and said surface forming said circumferential undercut in said end face are joined by a rounded surface.

8. A flowmeter measuring tube according to claim 1 wherein the angle between said second surface of said end face and said surface forming said circumferential undercut in said end face is a right angle.

* * * * *